United States Patent [19]

Naito et al.

[11] 3,872,079

[45] Mar. 18, 1975

[54] SEMISYNTHETIC DERIVATIVES OF TOBRAMYCIN

[75] Inventors: Takayuki Naito; Susumu Nakagawa, both of Tokyo, Japan

[73] Assignee: Bristol-Myers Company, New York, N.Y.

[22] Filed: Mar. 13, 1973

[21] Appl. No.: 340,852

Related U.S. Application Data

[63] Continuation-in-part of Ser. No. 232,978, March 8, 1972, abandoned.

[52] U.S. Cl............................ 260/210 AB, 424/180
[51] Int. Cl............................................. C07c 129/18
[58] Field of Search.................... 260/210 R, 210 AB

[56] References Cited
UNITED STATES PATENTS
3,781,268  12/1973  Kawaguchi et al........... 260/210 AB

OTHER PUBLICATIONS

Koch et al., "Antimicrobial Agents and Chemotherapy," 1970, pp. 309–313.

*Primary Examiner*—Johnnie R. Brown
*Assistant Examiner*—Cary B. Owens
*Attorney, Agent, or Firm*—Robert E. Havranek

[57] ABSTRACT

Derivatives of tobramycin (nebramycin factor 6) have been prepared which possesses substantially improved antibacterial activity. An example of such an agent is 1-[L-(−)-γ-amino-α-hydroxybutyryl]tobramycin [IVa, BB-K36].

7 Claims, No Drawings

3,872,079

SEMISYNTHETIC DERIVATIVES OF TOBRAMYCIN

CROSS-REFERENCE TO RELATED APPLICATION

This application is a continuation-in-part of copending application Ser. No. 232,978, filed Mar. 8, 1972, and now abandoned.

BACKGROUND OF THE INVENTION

1. Field of the Invention

This invention relates to semisynthetic 1-substituted derivatives of tobramycin, said compounds being prepared by acylating the 1-amino-function of tobramycin with a γ-amino-α-hydroxybutyryl, β-amino-α-hydroxypropionyl and δ-amino-α-hydroxyvaleryl moieties.

2. Description of the Prior Art

A. Nebramycin complex, prepared by the fermentation of Streptomyces tenebrarius (American Type Culture Collection—A.T.C.C. 17920 and 17921), is reported in Antimicrobial Agents and Chemotherapy, 1967, pp. 314–348.

B. One fraction of the above described nebramycin complex, therein described as factor 6, herein referred to as tobramycin, is reported in Antimicrobial Agents and Chemotherapy, 1970, pp. 309–313 as having the structure

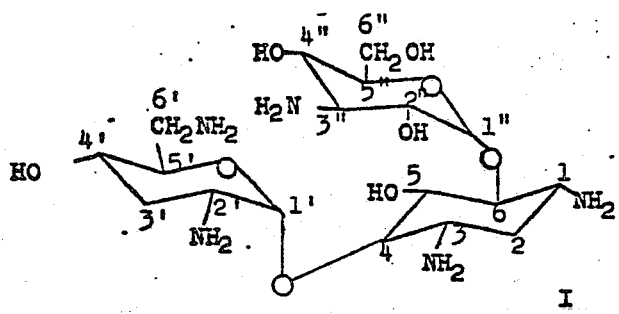

The compound is reported to possess broad spectrum antimicrobial activity, including activity against Pseudomonas and Proteus microorganisms.

C. Nebramycin complex (also called Tenebramycin complex) is described in British Pat. No. 1.178,489; Belgian Pat. No. 697,319; Canadian Pat. No. 881,488; and is indexed as Farmdoc No. 29,579F. The culture for the fermentation of nebramycin complex is deposited in the American Type Culture Collection as A.T.C.C. No. 17920 (Rockville, Md., U.S.A.).

D. U.S. Pat. No. 3,691,279 describes Nebramycin.

SUMMARY OF THE INVENTION

The compound having the formula

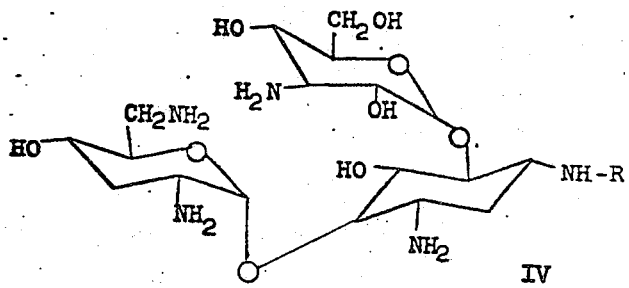

in which R is L-(−)-γ-amino-α-hydroxybutyrl, L-(−)-β-amino-α-hydroxypropionyl or L-(−)-δ-amino-α-hydroxyvaleryl; or a nontoxic pharmaceutically acceptable acid addition salt thereof is a valuable antibacterial agent.

This invention relates to semi-synthetic derivatives of tobramycin, said compounds being known as 1-[L-(−)-γ-amino-α-hydroxybutyrl]tobramycin, 1-[L-(−)-β-amino-α-hydroxypropionyl]tobramycin or 1-[L-(−)-δ-amino-α-hydroxyvaleryl]tobramycin and having the formula

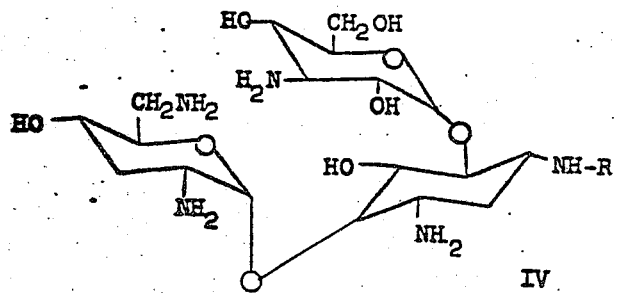

in which R is L-(−)-γ-amino-α-hydroxybutyryl, L-(−)-β-amino-α-hydroxypropionyl or L-(−)-δ-amino-α-hydroxyvaleryl; or a nontoxic pharmaceutically acceptable acid addition salt thereof.

For the purpose of this disclosure, the term "nontoxic pharmaceutically acceptable acid addition salt" shall mean a mono, di-, tri, tetra or pentasalt formed by the interaction of one molecule of compound IV with 1–5 moles of a nontoxic, pharmaceutically acceptable acid. Included among these acids are acetic, hydrochloric, sulfuric, maleic, phosphoric, nitric, hydrobromic, ascorbic, malic and citric acid, and those other acids commonly used to make salts of amine containing pharmaceuticals.

The compounds of the present invention are prepared by the following representative diagramatic scheme:

1.) Tobramycin $\xrightarrow{\text{N-(Benzyloxycarbonyloxy) Succinimide}}$

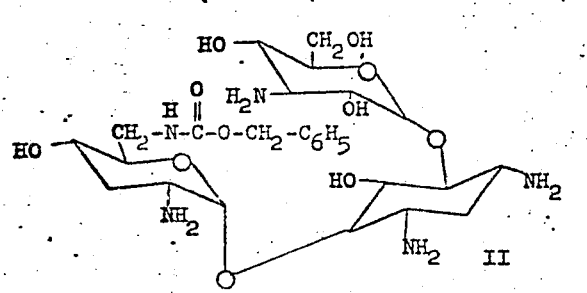

2.) Compound II $\xrightarrow{\substack{\text{N-Hydroxysuccinimide} \\ \text{ester of L-(−)-γ-} \\ \text{benzyloxycarbonylamino-} \\ \text{α-hydroxybutyric acid}}}$

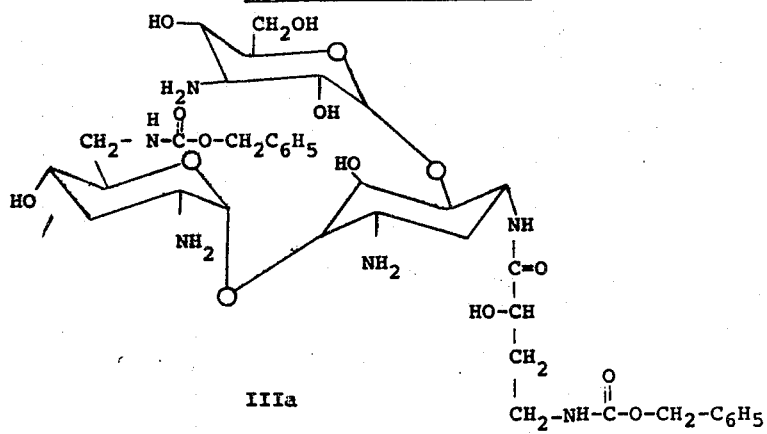

IIIa

3.) Compound IIIa $\xrightarrow{H_2/Pd/C}$

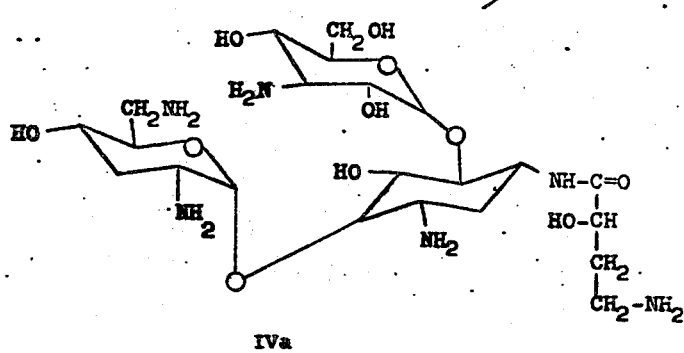

IVa

A preferred embodiment of the present invention is the compound having the formula

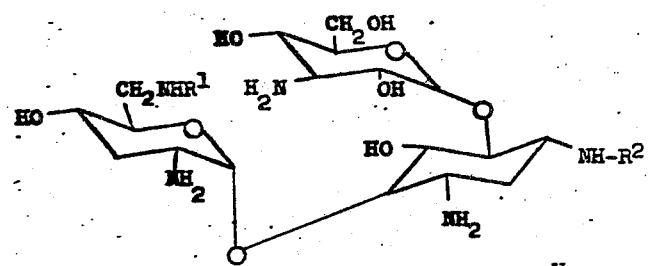

V in which $R^1$ is H or

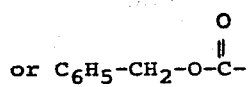

and $R^2$ is H, L-(−)-γ-amino-α-hydroxybutyryl, L-(−)-β-amino-α-hydroxypropionyl or L-(−)-δ-amino-α-hydroxyvaleryl; wherein $R^1$ or $R^2$ must be other than H;

or a nontoxic pharmaceutically acceptable acid addition salt thereof.

Another preferred embodiment is the compound of formula V in which R¹ is

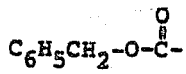

and R² is H.

A most preferred embodiment is the compound of formula V wherein R¹ is H and R² is L-(−)-γ-amino-α-hydroxybutyrl; or a nontoxic pharmaceutically acceptable acid addition salt thereof.

A most preferred embodiment is the compound of formula V wherein R¹ is H and R² is L-(−)-β-amino-α-hydroxypropionyl; or a nontoxic pharmaceutically acceptable acid addition salt thereof.

A most preferred embodiment is the compound of formula V wherein R¹ is H and R² is L-(−)-δ-amino-α-hydroxyvaleryl; or a nontoxic pharmaceutically acceptable acid addition salt thereof.

Other most preferred embodiments are the sulfate, hydrochloride, acetate, maleate, citrate, ascorbate, nitrate or phosphate salts of compound V.

Another most preferred embodiment is the monosulfate salt of compound IV.

The objectives of the present invention have been achieved, by the provision according to the present invention of the process for the preparation of the compound having the formula

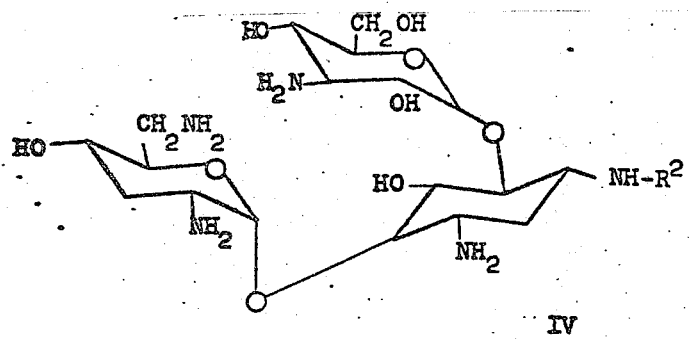

in which R² is L-(−)-γ-amino-α-hydroxybutyryl, L-(−)-β-amino-α-hydroxypropionyl or L-(−)-δ-amino-α-hydroxyvaleryl; or a nontoxic pharmaceutically acceptable acid addition salt thereof; which process comprises the consecutive steps of A. treating tobramycin with an agent selected from the compounds having the formulas

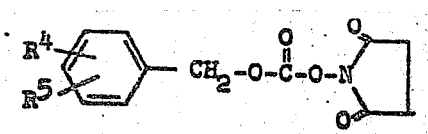

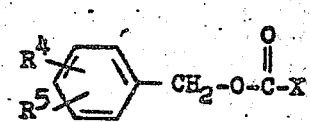

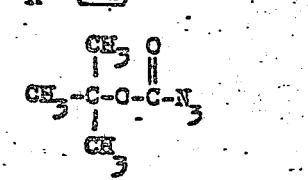

(or a carbodiimide addition compound thereof) or

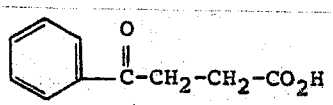

(or a carbodiimide addition thereof), in which R⁴ and R⁵ are alike or different and each is H, F, Cl, Br, NO₂, OH, (lower)alkyl or (lower)alkoxy, X is a chloro, bromo or iodo, or a functional equivalent as a reactant; in a ratio of one mole or less of agent per mole of tobramycin in a solvent, preferably selected from the group comprised of dimethylformamide, dimethylacetamide, tetrahydrofuran, dioxane, 1,2-dimethoxyethane, methanol, ethanol, water, acetone, pyridine, N-(lower)alkylpiperidine, or mixtures thereof, but preferably 1:1 water-tetrahydrofuran, at a temperature below 50°C. and preferably below 25°C., to produce the compound having the formula

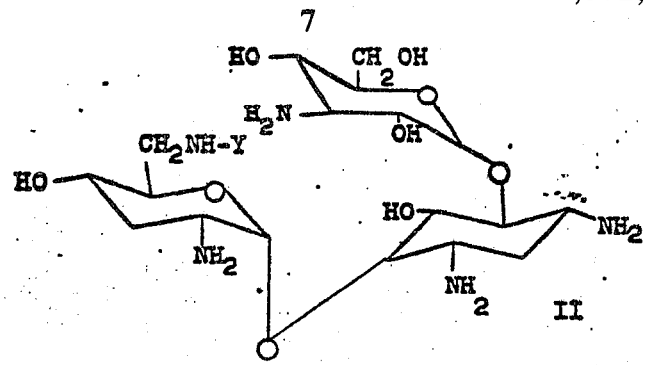
in which Y is a radical of the formula
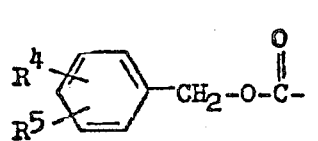 , 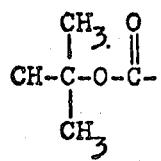 ,
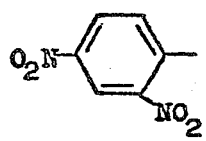 , 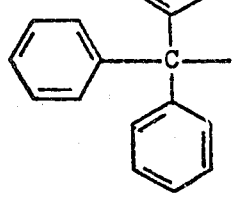 ,
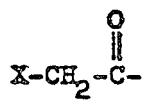 or 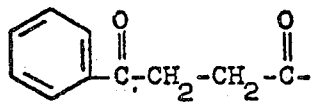 ,
in which $R^4$ and $R^5$ are as defined above;
B. acylating compound II with an acylating agent having the formula
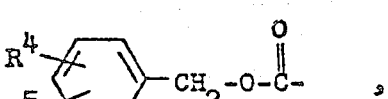 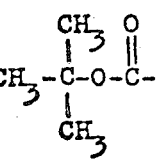 VII
in which $n$ is an integer of 1 to 3 inclusive and W is a radical selected from the group consisting
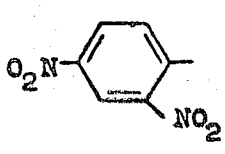 , 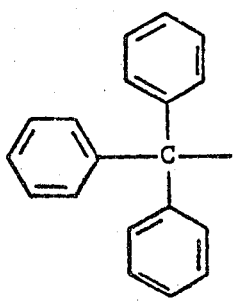 ,

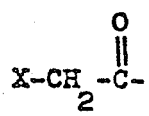 , or 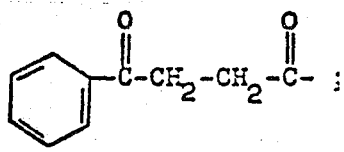 ;

but preferably 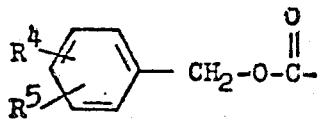 ,

M is a radical selected from the group comprising

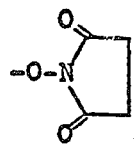 , 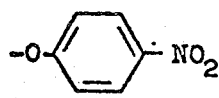 ,

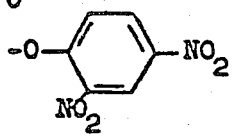 , 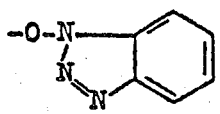 ,

 , but preferably 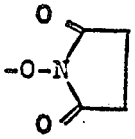 , in which $R^4$ and $R^5$ are as above; in a ratio of at least 0.5 mole of compound VII per mole of compound II, but preferably in a ratio of about 0.5 to about 1.4, and most preferably in a ratio of about 0.8 to about 1.1, in a solvent preferably selected from the group comprising a mixture of water and ethyleneglycol dimethyl ether, dioxane, dimethylacetamide, dimethylformamide, tetrahydrofuran, propyleneglycol dimethyl ether, or the like but preferably 1:1 water-tetrahydrofuran, to produce the compound of the formula

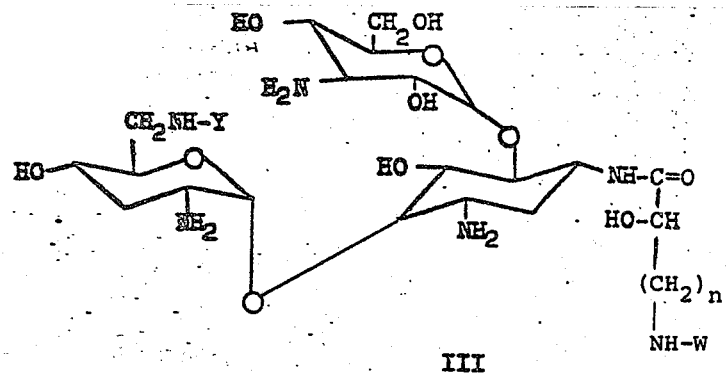

III in which $n$ is an integer of 1 to 3, and Y and W are as above; and

C. removing the blocking groups W and Y from compound III by methods commonly known in the art, and preferably when W and Y are radicals of the formula

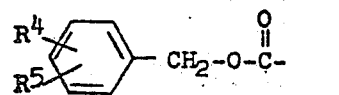 , by hydrogenating compound III with hydrogen in the presence of a metal catalyst, preferably selected from the group comprising palladium, platinum, Raney nickel, rhodium, ruthenium and nickel, but preferably palladium, and most preferably palladium on charcoal, in a water-water miscible solvent system, preferably selected from the group comprising water and dioxane, tetrahydrofuran, ethyleneglycol dimethyl ether, propyleneglycol dimethyl ether, or the like, but preferably 1:1 water-tetrahydrofuran.

It should be apparent to those knowledgeable in the art that other agents can be used in the process above to acylate the amine functions of the intermediate compounds of the instant invention. This disclosure is meant to include all such acylating agents that produce labile amine blocking groups, said labile blocking groups commonly employed in the synthesis of peptides. The labile blocking groups must be readily removable by methods commonly known in the art. Examples of said labile blocking groups and their removal can be found in the review of A. Kapoor, J. Pharm. Sciences 59, pp. 1–27 (1970). Functional equivalents as acylating agent for primary amine groups would include corresponding carboxylic chlorides, bromides, acid anhydrides, including mixed anhydrides and particularly the mixed anhydrides prepared from stronger acids such as the lower aliphatic monoesters of carbonic acid, of alkyl and aryl sulfonic acids and of more hindered acids such as diphenylacetic acid. In addition, an acid azide or an active ester of thioester (e.g., with p-nitrophenol, 2,4-dinitrophenol, thiophenol, thioacetic acid) may be used or the free acid itself may be coupled with compound II after first reacting said free acid with N,N'-dimethylchloroforminum chloride [cf. Great Britain Pat. No. 1,008,170 and Novak and Weichet, Experientia XXI/6, 360 (1965)] or by the use of enzymes or of an N,N'-carbonyldiimidazole or an N,N'-carbonylditriazole [cf. Sheehan and Hess, J. Amer. Chem. Soc., 77, 1067, (1955)] or of alkynylamine reagent [cf. R. Buijile and H. G. Viehe, Angew, Chem., International Edition 3, 582 (1964)], or of a ketenimine reagent [cf. C. L. Stevens and M. E. Monk, J. Amer. Chem. Soc. 80, 4065 (1958)] or of an isoxazolium salt reagent [cf. R. B. Woodward, R. A. Olofson and H. Mayer, J. Amer. Chem. Soc., 83, 1010 (1961)]. Another equivalent of the acid chloride is a corresponding azolide, i.e., an amide of the corresponding acid whose amide nitrogen is a member of a quasiaromatic five membered ring containing at least two nitrogen atoms, i.e., imidazole, pyrazole, the trizoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield diimidazolides. The by-product, imidazole, precipitates and may be separated and the imidazolide isolated, but this is not essential. These reactions are well-known in the art (cf. U.S. Pat. Nos. 3,079,314, 3,117,126 and 3,129,224 and British Pat. Nos. 932,644, 957,570 and 959,054).

Compound IVa, 1-[L-(−)-γ-amino-α-hydroxybutyryl]tobramycin possesses excellent antibacterial activity. Illustrated below in a table showing the minimal inhibitory concentrations (MIC's) of tobramycin and compound IVa (BB-K36) against a variety of gram-positive and gram-negative bacteria as obtained by the Steers agar-dilution method (Table I). Nutrient Agar Medium was used in the study of Table I.

TABLE I (MIC mg./ml.)

| Organism | Bristol Code No. | Resistant to * | KM-B | Tobra-M | IVa (BB-K36) |
|---|---|---|---|---|---|
| E. coli NIHJ | | | 0.8 | 0.4 | 0.8 |
| do. Juhl | A15119 | | 1.6 | 0.8 | 0.8 |
| do. | A15169 | | 1.6 | 0.4 | 0.8 |
| do. | A20363 | KM | 100 | 0.4 | 0.8 |
| do. | A9844 | | 0.8 | 0.4 | 1.6 |
| do. | A20365 | KM | 100 | 0.4 | 0.4 |
| do. K-12 | | | 0.4 | 0.4 | 1.6 |
| do. K-12 | A20664 | MK | 0.8 | 1.6 | 1.6 |
| do. K-12 | A20665 | KM | 50 | 0.4 | 1.6 |
| do. | A20684 | | 0.4 | 0.2 | 0.4 |
| do. | A20683 | KM, GM | >100 | 12.5 | 1.6 |
| do. | A9535 | | 0.8 | 0.8 | 1.6 |
| do. | A15148 | | 0.8 | 0.8 | 1.6 |
| do. | A15164 | | 0.8 | 0.8 | 1.6 |
| do. | A15170 | | 0.8 | 0.4 | 0.8 |
| do. | A20102 | | 0.8 | 0.8 | 1.6 |
| K. pneumoniae D-11 | | | 0.1 | 0.2 | 0.2 |
| do. | A20680 | KM, GM | >100 | 12.5 | 1.6 |
| Klebsiella sp. | A9661 | | 0.8 | 0.8 | 1.6 |
| do. | A9662 | | 0.8 | 0.8 | 1.6 |
| P. aeruginosa D15 | | | 12.5 | 0.4 | 1.6 |
| do. D113 | | KM | >100 | 1.6 | 6.3 |
| do. | A9923 | | 25 | 1.6 | 6.3 |
| do. | A9930 | | 6.3 | 0.2 | 0.4 |
| do. | A15150 | | 50 | 1.6 | 6.3 |
| do. | A15194 | | 1.5 | 1.6 | 3.1 |
| do. | A20479 | KM | >100 | 3.1 | 6.3 |
| do. | A20616 | KM | 100 | 3.1 | 12.5 |
| do. | A20653 | KM | >100 | 1.6 | 12.5 |
| do. | A9843 | | 50 | 1.6 | 6.3 |
| Pseudomonas sp. | A20355 | | 6.3 | 0.8 | 1.6 |
| do. | A20358 | | 12.5 | 1.6 | 6.3 |
| do. | A20368 | GM | 6.3 | 12.5 | 100 |
| do. | A20598 | GM | 50 | 1.6 | 12.5 |
| do. | A20600 | GM | 12.5 | 0.8 | 6.3 |
| do. | A20603 | KM, GM | >100 | 6.3 | 100 |
| do. | A20618 | KM, GM | >100 | >50 | 100 |
| do. | A20594 | KM, GM | 100 | 3.1 | 12.5 |
| S. marcescens | A20019 | | 0.8 | 1.6 | 3.1 |
| P. vulgaris | A9436 | | 0.2 | 0.2 | 0.4 |
| do. | A9526 | | 0.4 | 0.2 | 0.4 |
| do. | A9699 | | 0.8 | 0.4 | 1.6 |
| ATCC 9920 | | | 0.2 | 0.1 | 0.8 |
| do. | A9539 | | 0.2 | 0.1 | 0.8 |
| do. | A9716 | | 1.6 | 0.4 | 3.1 |

TABLE I (MIC mg./ml.) — Continued

| Organism | Bristol Code No. | Resistant to * | KM-B | Tobra-M | IVa (BB-K36) |
|---|---|---|---|---|---|
| P. morganii | A9553 | | 0.4 | 0.2 | 0.4 |
| do. | A20031 | | 0.8 | 0.4 | 1.6 |
| do. | A9636 | | 0.4 | 0.4 | 0.8 |
| do. | A15153 | | 0.2 | 0.8 | 3.1 |
| do. | A15166 | | 0.4 | 0.4 | 0.8 |
| do. | A20455 | | 0.8 | 0.8 | 0.8 |
| do. | A20457 | | 0.8 | 0.4 | 0.8 |
| P. rettgeri | A15167 | | 0.4 | 0.2 | 0.4 |
| do. | A9637 | | 0.4 | 0.2 | 0.8 |
| P. inconotans | A20615 | | 6.3 | 6.3 | 3.1 |
| P. mirabilis | A9554 | | 0.8 | 0.4 | 1.6 |
| do. | A9900 | | 0.4 | 0.2 | 0.8 |
| do. | A20119 | | 0.8 | 0.8 | 3.1 |
| do. | A20454 | | 0.8 | 0.8 | 3.1 |
| S. aureus 209P | | | 0.4 | 0.2 | 0.8 |
| do. Smith | | | 0.2 | 0.1 | 0.4 |
| S. aureus 209P R-41 | | SM | 0.4 | 0.2 | 0.8 |
| do. | A20239 | KM | 50 | 0.4 | 0.8 |
| B. subtilis PCI-219 | | | 0.1 | 0.05 | 0.1 |

*KM—Kanamycin A
KM-B—Kanamycin B
GM—Gentamicin
Tobra-M—Tobramycin

A further preferred embodiment is the disulfate salt of compound IV.

Compounds IV are valuable as an antibacterial agent, nutritional supplement in animal feeds, therapeutic agent in poultry and animals, including man, and are especially valuable in the treatment of infectious diseases caused by Gram-positive and Gram-negative bacteria.

Compounds IV when administered orally are useful as an adjunctive treatment for preoperative sterilization of the bowel. Both aerobic and anaerobic flora which are susceptible to these drugs are reduced in the large intestine. When accompanied by adequate mechanical cleansing, they are useful in preparing for colonic surgery.

Compounds IV are effective in the treatment of systemic bacterial infections when administered parenterally in the dosage range of about 250 mg. to about 3,000 mg. per day in divided doses three or four times a day. Generally the compounds are effective when administered at a dosage of about 5.0 to 7.5 mg./kg. of body weight every 12 hours.

Compounds of formula IV and the salts thereof are known to form mono-and polyhydrates upon isolation from aqueous solvents. Accordingly, the hydrates so produced are considered an integral part of the instant invention.

EXAMPLES

EXAMPLE 1

Preparation of
L-(−)-γ-Benzyloxycarbonylamino-α-hydroxybutyric Acid (VIa)

L-(−)-γ-amino-α-hydroxybutyric acid (7.4 g., 0.062 mole) was added to a solution of 5.2 g. (0.13 mole) of sodium hydroxide in 50 ml. of water. To the stirred solution was added dropwise at 0°–5°C. over a period of 0.5 hour, 11.7 g. (0.068 mole) of carbobenzoxy chloride and the mixture was stirred for one hour at the same temperature. The reaction mixture was washed with 50 ml. of ether, adjusted to pH 2 with dilute hydrochloric acid and extracted with four 80-ml. portions of ether. The ethereal extracts were combined, washed with a small amount of saturated sodium chloride solution, dried with anhydrous sodium sulfate and filtered. The filtrate was evaporated in vacuo and the resulting residue was crystallized from benzene to give 11.6 g. (74%) of colorless plates; melting point 78.5°–79.5° C., $[\alpha]_D$ −4.5° (c=2, CH$_3$OH). Infrared (IR) [KBr]: $\gamma_{c=o}$ 1740, 1690 cm$^{-1}$. Nuclear Magnetic Resonance (NMR) (acetone-d$_6$)δ (in ppm from TMS) 2.0 (2H, m), 3.29 (2H, d-d, J=6.7 and 12 Hz), 4.16 (1H, d-d, J=4.5 and 8Hz), 4.99 (2H,s), 6.2 (2H, broad), 7.21 (5H,s). The product is compound VIa.

Anal. calc'd for C$_{12}$H$_{15}$NO$_5$: C, 56.91; H, 5.97; N, 5.53.
Found: C, 56.66; H, 5.97; N, 5.47.

EXAMPLE 2

N-Hydroxysuccinimide Ester of
L-(−)-γ-benzyloxycarbonylamino-α-hydroxybutyric Acid (VIIa)

A solution of 10.6 g. (0.042 mole) of VIa and 4.8 g. (0.042 mole) of N-hydroxysuccinimide[1] in 200 ml. of ethyl acetate was cooled to 0° C. and then 8.6 g. (0.042) mole of N,N'-dicyclohexylcarbodiimide was added. The mixture was kept overnight in a refrigerator. The dicyclohexylurea which separated was filtered off and the filtrate was concentrated to about 50 ml. under reduced pressure to give colorless crystals of VIIa which were collected by filtration; 6.4 g./m.p. 121°–122.5°C. The filtrate was evaporated to dryness in vacuo and the cyrstalline residue was washed with 20 ml. of a benzene-n-hexane mixture to give an additional amount of VIIa. The total yield was 1.34 g. (92%). $[\alpha]_{Dt}$ 1.5° (c=2, CHCl$_3$) IR(KBr)$\gamma_{c=o}$ 1810, 1755, 1740, 1680 cm$^{-1}$. NMR (acetone-d$_6$)δ (in ppm from TMS) 2.0 (2H,m), 2,83(4H,s), 3.37(2H,d-d, J=6.5 and 12.5 Hz), 4.56 (1H,m), 4.99(2H,s), 6.3(2H,broad), 7.23(5H,s).

Anal. calc'd C$_{16}$H$_{18}$N$_2$O$_7$: C,54.85; N,5.18; N, 8.00.
Found: C, 54.79, 54.70; H, 5.21, 5.20; N, 8.14, 8.12.

([1] G. W. Anderson et al., J. Am. Chem. Soc., 86, 1839 (1964).)

EXAMPLE 3

Preparation of 6'-N-Benzyloxycarbonyltobramycin (II).

To a stirred solution of 250 mg. (0.53 m. mole) of tobramycin in 13 ml. of water and 13 ml. of tetrahydrofuran (THF) was added 135 mg. (0.53 m. mole) of N-benzyloxycarbonyloxy-succinimide at 10°C. The reaction mixture was stirred overnight at room temperature and evaporated under reduced pressure to remove the organic solvent. The resultant aqueous solution being filtered to remove insoluble material, the filtrate was charged on a column of CG-50 ($NH_4^+$ type, 10 ml. capacity). The column was washed with 50 ml. of water and eluted with 0.1 N ammonia. The eluate was collected in 10 ml.-fractions. Fraction numbers 7 to 40 were combined, evaporated under reduced pressure and lyophilized to give 228 mg. (72%) of crude 6'-N-benzyloxycarbonyltobramycin, which did not contain tobramycin itself. M.p. 155°-56°C. (dec.) $IR_{\gamma_{c=o}}$ 1700 $cm^{-1}$. The product was used for the next reaction without further purification.

Anal. calc'd for $C_{26}H_{43}N_5O_{11} \cdot H_2CO_3 \cdot 4H_2O$:
C, 44.08; H, 7.26; N, 9.52.
Found: C, 44.19;
H, 6.54; N, 9.79.

EXAMPLE 4

Preparation of 1-[L-(−)-γ-benzyloxycarbonylamino-α-hydroxybutyryl]-6'-carbobenzoxytobramycin (IIIa)

6'-N-benzyloxycarbonyltobramycin (200 mg., 0.33 m.mole) was dissolved in 10 ml. of water and 10 ml. of THF. The solution was cooled to 10°C. and 117 mg. (0.33 m.mole) of N-hydroxysuccinimide ester of L-(−)-γ-benzyloxycarbonylamino-α-hydroxybutyric acid. The mixture was stirred at room temperature overnight and yielded the title product as a crude solid upon evaporation of the solvent.

EXAMPLE 5

Preparation of 1-[L-(−)-γ-amino-α-hydroxybutyryl]tobramycin (IVa, BB-K36)

The crude product IIIa from example 4 was dissolved in 20 ml. of 1:1 water-THF and then hydrogenated under atmospheric pressure in the presence of 60 mg. of 10% palladium on charcoal overnight at room temperature. The reaction mixture was filtered and evaporated under reduced pressure to remove the organic solvent. The resultant aqueous solution was absorbed on a column of CG-50 ($NH_4^+$, 9 ml.). The column was washed with 30 ml. of water and eluted successively with 520 ml. of 0.1 N ammonia, 500 ml. of 0.2 N ammonia and 720 ml. of 0.5 N ammonia. The eluate was collected in 10 ml.-fractions. Fractions 89 through 102 which showed a bioactive spot at Rf 0.4 by thin layer chromotography (TLC) on system S-110 (silica gel plate, $CH_3CL-CH_3OH-28\%NH_4OH-H_2O$; 1:4:2:1) were combined, concentrated under reduced pressure and lyophilized to give 19 mg. of BB-K35*, m.p. 219°-223° (dec.), $\gamma_{c=o}$ 1750 $cm^{-1}$.

Anal. calc'd for $C_{22}H_{44}N_6O_{11} \cdot 2H_2CO_3 \cdot 2H_2O$:
C, 37.69; H, 7.38; N, 10.99.
Found: C, 37.68;
H, 6.75; N, 10.59.

Fractions 105 to 111 were combined, evaporated under reduced pressure and lyophilized to give 35 mg. of a mixture which showed two bioactive spots at Rf 0.23 (BB-K36) and 0.38 (BB-K35) by TLC. The mixture was dissolved in 2 ml. of water and absorbed on a column of CG-50 ($NH_4^+$, 5 ml.). The column was eluted with 175 ml. of 0.2 N ammonia and 400 ml. of 0.5 N ammonia. The eluate was collected in 5 ml.-fraction. Fraction numbers 47 to 55 were combined, evaporated under reduced pressure and lyophilized to give 6 mg. (3%) of BB-K36, m.p. 205°-6° (dec.), $\gamma_{c=o}$ 1650 $cm^{-1}$. A mixture of 20 mg. of BB-K35 and BB-K36 was recovered from fraction numbers 40 to 46.

Fractions 126 to 131 in the original column were combined, evaporated under reduced pressure and lyophilized to give 7 mg. (4%) of BB-K37**, which showed a spot at 0.13 by TLC (S-110, ninhydrin and bioautograph). M.p. 209°-10° (dec.) $\gamma_{c=o}$ 1650 $cm^{-1}$.

(*BB-K35 is thought to be 2'-[L-(−)-γ-amino-α-hydroxybutyrl]tobramycin.
**BB-K37 is thought to be 1,2'- or 1,3- or 1,6'-Di[L-(−)-γ-amino-α-hydroxybutyrl]tobramycin.)

EXAMPLE 5a

Preparation of N-(Benzyloxycarbonyloxy)succinimide

N-Hydroxysuccinimide (23 g., 0.2 mole) was dissolved in a solution of 9 g. (0.22 mole) of sodium hydroxide in 200 ml. of water. To the stirred solution was added dropwise 34 g. (0.2 mole) of carbobenzoxy chloride with water-cooling and then the mixture was stirred at room temperature overnight to separate the carbobenzoxy derivative which was collected by filtration, washed with water and air dried. Yield 41.1 g. (82%). Recrystallization from benzene-n-hexane (10:1) gave colorless prisms melting at 78°-79°C.

EXAMPLE 6

Preparation of L-(−)-γ-amino-α-hydroxybutyric acid from ambutyrosin A or B or mixtures thereof Ambutyrosin A (5.0 gm.) [U.S. Pat. No. 3,541,078, issued Nov. 17, 1970] was refluxed with 160 ml. of 0.5 N sodium hydroxide for one hour. The hydrolysate was neutralized with 6N HCl and chromatographed on a column of CG-50 ($NH_4^+$ type). The desired L-(−)-γ-amino-α-hydroxybutyric acid was isolated by developing the column with water and removing the water by freeze drying. The L-(−)-γ-amino-α-hydroxybutryic acid is characterized as a crystalline material having a m.p. of 212.5°-214.5° C. [Column 2, lines 31-28, U.S. Pat. No. 3,541,078].

EXAMPLE 7

Preparation of L-(−)-γ-amino-α-hydroxybutric Acid from DL-α-hydroxy-γ-phtalimidobutyric Acid A. Dehydroabietylammonium L-α-hydroxy-γ-phtalimidobutyrate To a solution of 25 g. (0.1 mole) of α-hydroxy-γ-phtalimidobutyric acid[1] in 200 ml. of ethanol was added a solution of 29 g. (0.1 mole) of dehydrobietylamine in 130 ml. of ethanol. The solution was shaken vigorously for a minute and stood at room temperature for 5 hours during which time fine needles crystallized out. The crystals were collected by filtration, washed with 50 ml. of ethanol and air-dried to obtain 30.1 g. (56%) of a diastereomer of the dehydroabietylamine salt. M.p. 93°-94° C. $[\alpha]_D^{24}$ + 15° (C. 2.5, MeOH). Recyrstallization from 300 ml. of ethanol gave 23.2 g. (43%) of the pure product. M.p. 94°-95°C. $[\alpha]^{24}$ +

10.8° (C. 2.5 MeOH). Further recrystallization did not change the melting point and the specific rotation.

Anal. calc'd. for $C_{32}H_{42}N_2O_5 \cdot H_2O$: C, 69.54; H, 8.02; N, 5.07.
Found: C, 69.58; H, 8.08; N, 5.07.

([1.] Y. Saito et al., Tetrahedron Letters, 1970, 4863.)

B. L-(−)-γ-amino-α-hydroxybutyric Acid

To a solution of 1.5 g. (0.014 mole) of sodium carbonate in 40 ml. of water were added 5.3 g. (0.01 mole) of dehydroabietylammonium-L-α-hydroxy-γ-phthalimidobutyrate and 60 ml. of ether. The mixture was shaken vigorously until all of the solid has dissolved. The ether layer was separated. The aqueous solution was washed twice with 30-ml. portions of ether and evaporated to 15-ml. under reduced pressure. To the concentrate was added 10 ml. of concentrated hydrochloric acid and the mixture was refluxed for 10 hours. After cooling, separated phthalic acid was removed by filtration. The filtrate was evaporated under reduced pressure. The residue was dissolved in 10 ml. of water and the solution was evaporated to dryness. This operation was repeated twice to remove excess hydrochloric acid. The residual syrup was dissolved in 10 ml. of water and filtered to remove a small amount of insoluble phthalic acid. The filtrate was adsorbed on a column of IR-120 ($H^+$, 1 cm. × 35 cm.), the column was washed with 300 ml. of water and eluted with 1 N ammonium hydroxide solution. The eluate was collected in 15 ml. fraction. The ninhydrin positive fractions 10 to 16 were combined and evaporated under reduced pressure to give a syrup which crystallized gradually. The crystals were triturated with ethanol, filtered and dried in a vacuum desiccator to give 0.78 g. (66%) of L-(−)-γ-amino-α-hydroxybutyric acid. M.p. 206°–207° C. $[\alpha]_D^{24}$ −29° (C, 2.5, $H_2O$). The IR spectrum was identical with an authentic sample which was obtained from ambutyrosin.

EXAMPLE 8

Preparation of the Monosulfate Salt of 1-[L-(−)-γ-amino-α-hydroxybutyryl]tobramycin One mole of 1-[L-(−)-γ-amino-α-hydroxybutyryl]tobramycin is dissolved in 1 to 3 liters of water. The solution is filtered to remove any undissolved solids. To the chilled and stirred solution is added one mole of sulfuric acid dissolved in 500 ml. of water. The mixture is allowed to stir for 30 minutes, following which cold ethanol is added to the mixture until precipitation occurs. The solids are collected by filtration and are determined to be the desired monosulfate salt.

EXAMPLE 9

Preparation of the Disulfate Salt of 1-[L-(−)-γ-amino-α-hydroxybutyryl]tobramycin One mole of 1-[L-(−)-γ-amino-α-hydroxybutyryl]tobramycin is dissolved in 1 to 3 liters of water. The solution is filtered to remove any undissolved solids. To the chilled and stirred solution is added 2 moles of sulfuric acid dissolved in 500 ml. of water. The mixture is allowed to stir for 30 minutes, following which cold ethanol is added to the mixture until precipitation occurs. The solids are collected by filtration and are determined to be the desired disulfate salt.

EXAMPLE 10

Preparation of L-β-Benzyloxycarbonylamino-α-hydroxypropionic Acid (IVb)

L-β-Amino-α-hydroxypropionic acid* (8.2 g., 0.078 mole) was dissolved in a solution of 6.56 g. (0.0164 mole) of sodium hydroxide and in 60 ml. of water. To the stirred solution was added dropwise 14.7 g. (0.086 mole) of carbobenzoxy chloride below 5° C. The mixture was stirred for an hour at room temperature, washed with 60 ml. of ether and adjusted to pH 2 with dilute HCl. The precipitate was collected by filtration, washed with water and air-dried to give 9.65 g. (52%) of VI. The filtrate was extracted with five 100-ml. portions of ether. The ethereal solution was washed with water, dried over sodium sulfate and evaporated to dryness in vacuo to give additional 2.0 g. (11%) of VI. A total of 11.65 g. of VI was crystallized from 500 ml. of benzene-ethyl acetate (4:1) to give 9.36 g. (50%) of pure VI, m.p. 128.5°–129.5° C. Infrared (IR) (KBr): $\gamma_{c=o}$ 1745, 1690 $cm^{-1}$. $[\alpha]_D^{25}$ +2.9° (c 5.0, MeOH). Nuclear Magnetic Resonance Spectra [NMR (DMSO-$d_6$)]: δ (in ppm) 3.05–3.45 (2H, m, $CH_2N$), 4.05 (1H, d-d, —O—CH—CO—), 5.03 (2H, s, $CH_2Ar$) 7.18 (1H, broad, NH), 7.36 (5H, s, ring H).

Anal. calc'd. for $C_{11}H_{13}NO_5$: C, 55.23; H, 5,48; N, 5.86.
Found: C, 55.34; H, 5.49; N, 5.87.

(*K. Freudenberg, Ber., 47, 2027 (1914).)

EXAMPLE 11

N-HYdroxysuccinimide Ester of L-β-benzyloxycarbonylamino-amino-α-hydroxypropionic Acid (VIIb)

To a chilled and stirred solution of 478 mg. (2 m.moles) of VIb and 230 mg. (2 m.moles) of N-hydroxysuccinimide in 10 ml. of tetrahydrofuran (THF) was added 412 mg. (2 m.moles) of dicyclohexylcarbodiimide. The mixture was stirred for an hour at 0°–5° C., for 2 hours at room temperature and then filtered to remove the N,N'-dicyclohexylurea. The filtrate containing VIIb was used for the next reaction without isolation.

EXAMPLE 12

Preparation of 1-[L-(−)-β-amino-α-hydroxypropionyl]tobramycin (IVb)

A. Substitution in the procedure of example 4 for the N-hydroxysuccinimide ester of L-(−)-γ-benzyloxycarbonylamino-α-hydroxybutyric acid VIIa used therein of an equimolar quantity of N-hydroxysuccinimide ester of L-(−)-β-benzyloxyearbonylamino-α-hydroxypropionic acid VIIb produces 1-[L-(−)-β-benzyloxycarbonylamino-α-hydroxypropionyl]-6'-carbobenzoxytobramycin (IIIb).

B. Substitution in the procedure of example 5 for the crude product IIIa used therein of an equimolar quantity of compound IIIb produces 1-[L-(−)-β-amino-α-hydroxypropionyl]tobramycin (IVb).

EXAMPLE 13

Preparation of
L-δ-Benzyloxycarbonylamino-α-hydroxyvaleric acid
(VIc)

To a stirred solution of 400 mg (3.0 m moles) of L-δ-amino-α-hydroxyvaleric acid* and 250 mg (6.5 m moles) of sodium hydroxide in 25 ml of water was added dropwise 580 mg (3.3 m moles) of carbobenzoxy chloride over a period of 30 minutes at 0°–5°C. The mixture was stirred for an hour at 5°–15°C, washed with 25 ml of ether, adjusted to pH 2 with hydrochloric acid and extracted with three 30-ml portions of ether. The combined ethereal solution was shaken with 10 ml of a saturated sodium chloride solution, dried over anhydrous sodium sulfate and evaporated in vacuo to give crystals which were recrystallized from benzene to yield 631 mg (78%) of VIc, mp 110°–111°C.; infrared spectrum [IR(KBr)]: 3460, 3350, 1725, 1685, 1535, 1280, 730, 690cm$^{-1}$. Nuclear magnetic resonance spectrum [NMR(acetone-d$_6$)] δ (in ppm) 1.70(4H, m) 4.14(2H, q, J=4.5Hz), 4.19(1H, m), 4.82(2H, s), 6.2(3H, broad), 7.25(5H, s). [α]$_D^{25}$ + 1.6 (c 10, MeOH).

Anal Calc'd. for C$_{13}$H$_{17}$NO$_5$: C, 58.42; H, 6.41; N, 5.24.
Found: C, 58.36; H, 6.50; N, 5.27.

(*S. Ohshiro et al., Yakugaku Zasshi, 87, 1184 (1967).)

EXAMPLE 14

N-Hydroxysuccinimide ester of
L-δ-benzyloxycarbonylamino-α-hydroxyvaleric acid
(VIIc)

To a stirred and chilled solution of 535 mg (2.0 m moles) of VIc and 230 mg (2.0 m moles) of N-hydroxysuccinimide in 55 ml of ethyl acetate was added 412 mg (2.0 m moles) of N,N'-dicyclohexylcarbodiimide (DCC). The mixture was stirred for 3 hours at room temperature and filtered to remove precipitated N, N'-dicyclohexylurea. The filtrate was evaporated in vacuo to yield 780 mg (100%) of viscous syrup (VIIc). IR(Neat): γ$_{C=O}$ 1810, 1785, 1725 cm$^{-1}$.

EXAMPLE 15

Preparation of
1-[L-(−)-δ-amino-α-hydroxyvaleryl]tobramycin (IVc)

A. Substitution in the procedure of example 4 for the N-hydroxysuccinimide ester of L-(−)-γ-benzyloxycarbonylamino-α-hydroxybutyric acid VIIa used therein of an equimolar quantity of N-hydroxysuccinimide ester of L-(−)-δ-benzyloxycarbonylamino-α-hydroxyvaleric acid VIIc produces 1-[L-(−)-δ-benzyloxycarbonylamino-α-hyroxyvaleryl]-6'-carbobenzoxytobramycin (IIIc).

B. Substitution in the procedure of example 5 for the crude product IIIa used therein of an equimolar quantity of compound IIIc produces 1-[L-(−)-δ-amino-α-hydroxyvaleryl]tobramycin (IVc).

Amberlite CG-50 is the tradename for the chromatographic grade of a weakly acidic cationic exchange resin of a carboxylic-polymethacrylic type.

Amberlite IR-120 is the tradename for a high density nuclear sulfonic acid type cationic exchange resin supplied in either hydrogen or sodium form as beads—16-50 mesh.

We claim:
1. A compound having the formula

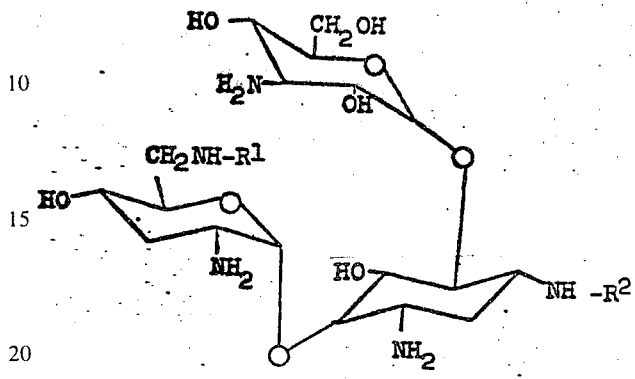

in which R$^1$ is H or

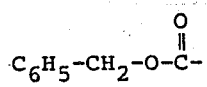

and R$^2$ is H, L-(−)-γ-amino-α-hydroxybutyryl, L-(−)-β-amino-α-hydroxypropionyl, L-(−)-δ-amino-α-hydroxyvaleryl, L-(−)-γ-benzyloxycarbonylamino-α-hydroxybutyryl, L-(−)-β-benzyloxycarbonylamino-α-hydroxypropionyl, or L-(−)-δ-benzyloxycarbonylamino-α-hydroxyvaleryl, wherein R$^1$ or R$^2$ must be other than H; or a nontoxic pharmaceutically acceptable acid addition salt thereof.

2. The compound of claim 1 wherein R$^1$ is

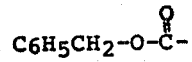

and R$^2$ is H.

3. The compound of claim 1 wherein R$^1$ is

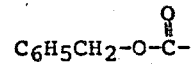

and R$^2$ is L-(−)-γ-benzyloxycarbonylamino-α-hydroxybutyryl, L-(−)-β-benzyloxycarbonylamino-α-hydroxypropionyl or L-(−)-δ-benzyloxycarbonylamino-α-hydroxyvaleryl.

4. The compound of claim 1 wherein R$^1$ is H and R$^2$ is L-(−)-γ-amino-α-hydroxybutyryl, L-(−)-β-amino-α-hydroxypropionyl or L-(−)-δ-amino-α-hydroxyvaleryl; or a nontoxic pharmaceutically acid addition salt thereof.

5. The compound of claim 4 wherein R$^1$ is H and R$^2$ is L-(−)-γ-amino-α-hydroxybutyryl; or the mono- or disulfate salt thereof.

6. The compound of claim 4 wherein R$^1$ is H and R$^2$ is L-(−)-β-amino-α-hydroxypropionyl; or the mono- or disulfate salt thereof.

7. The compound of claim 4 wherein R$^1$ is H and R$^2$ is L-(−)-δ-amino-α-hydroxyvaleryl; or the monodisulfate salt thereof.

* * * * *